Feb. 14, 1939.    E. J. WIENKE    2,146,785
EXCITER LAMP AND SOUND SLIT LENS MOUNTING FOR PROJECTORS
Filed Nov. 13, 1936    3 Sheets-Sheet 1

Inventor:
Emil J. Wienke
By: Zabel Carlson & Wells
Attys.

Feb. 14, 1939.   E. J. WIENKE   2,146,785
EXCITER LAMP AND SOUND SLIT LENS MOUNTING FOR PROJECTORS
Filed Nov. 13, 1936   3 Sheets-Sheet 3
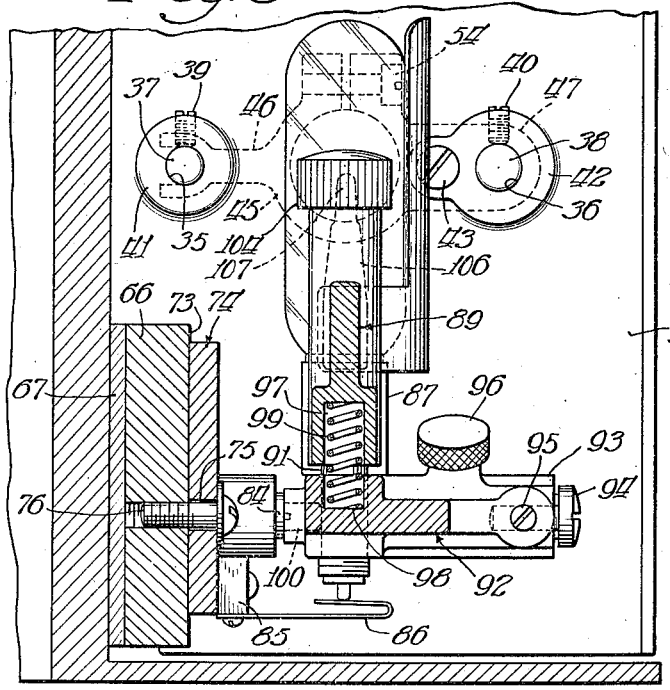
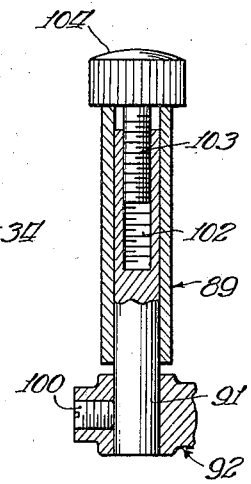
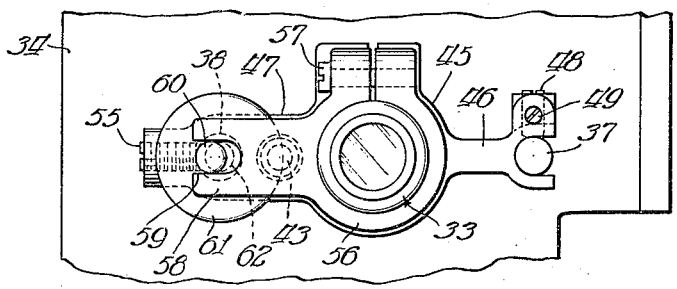
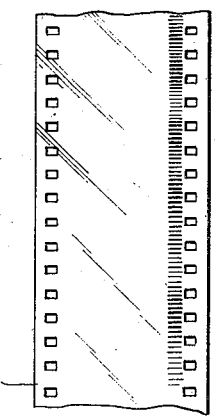
Inventor:
Emil J. Wienke
By Zabel Carlson & Cuell
Attys Patented Feb. 14, 1939

2,146,785

UNITED STATES PATENT OFFICE 2,146,785

EXCITER LAMP AND SOUND SLIT LENS MOUNTING FOR PROJECTORS

Emil J. Wienke, Chicago, Ill., assignor to Motiograph, Inc., Chicago, Ill., a corporation of Illinois Application November 13, 1936, Serial No. 110,673

7 Claims. (Cl. 179—100.3)

This invention relates to sound reproducers adapted for use in reproducing sound from sound recordings on film.

It is the principal purpose of this invention to improve the mechanism whereby the light from an exciter lamp is transmitted to the film as the film passes over a sound slit through which the light is directed to a photoelectric cell.

My invention contemplates the provision of a novel means for mounting the lens which focuses the light at the sound slit past which the film sound track is moved.

The invention further contemplates a novel structure whereby the exciter lamp which furnishes the light is entirely isolated from mechanical vibration and is further readily adjustable vertically, longitudinally, and laterally to a degree of accuracy heretofore considered impractical to obtain.

Further features and advantages of the invention will appear more readily as the description proceeds, reference being had to the accompanying drawings wherein a preferred form of the invention is shown.

In the drawings—

Fig. 3 is a sectional view taken on the line 3—3 of Fig. 1;

Fig. 4 is a fragmentary view taken on the line 4—4 of Fig. 1;

Fig. 5 is a fragmentary sectional view taken on the line 5—5 of Fig. 1; and

Fig. 6 is a fragmentary view of a section of film showing the sound track thereon.

Figure 1:
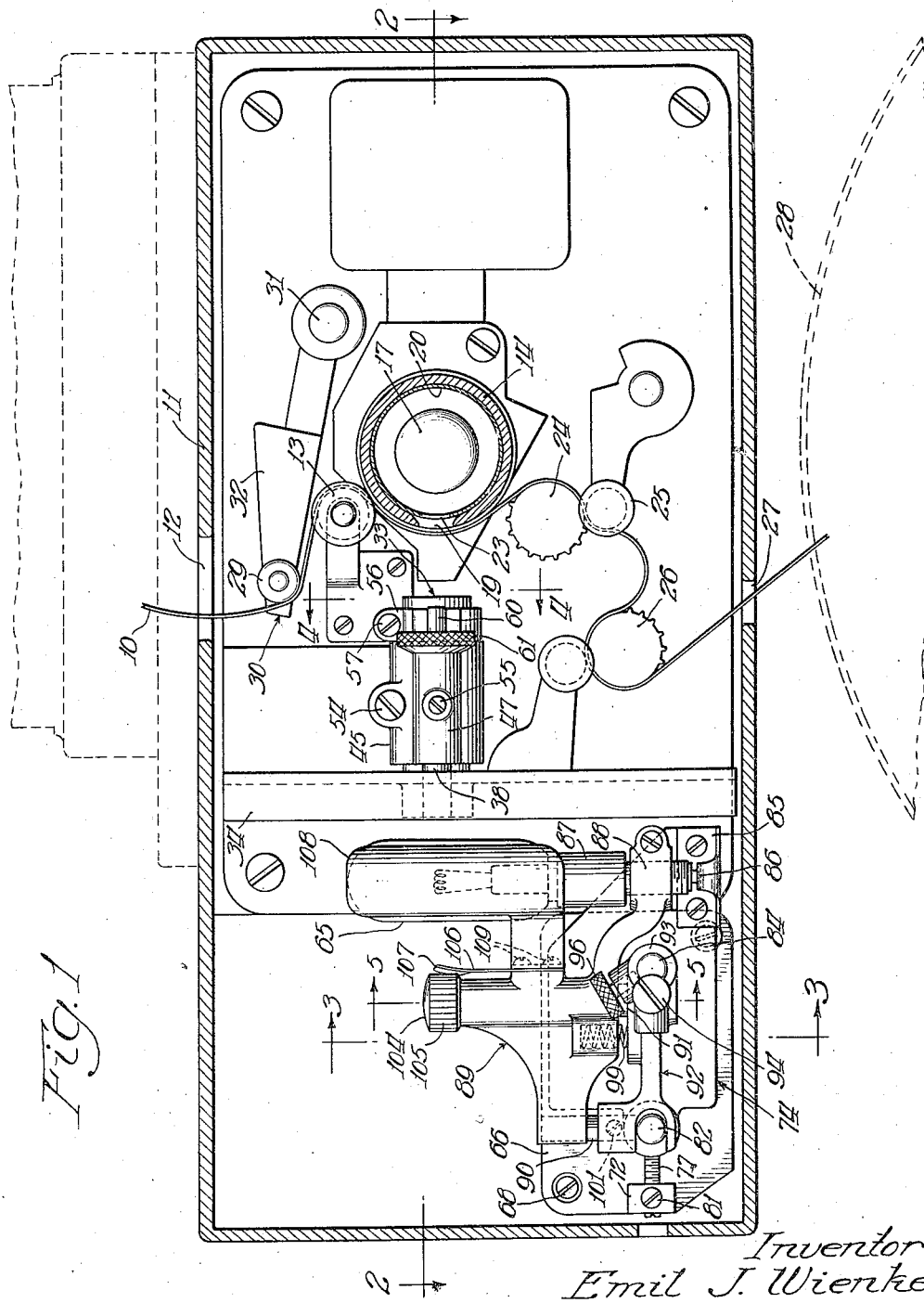
Fig. 1 is a view in side elevation of a sound reproducer mechanism embodying the present invention.

Referring now in detail to the drawings, the invention is shown as embodied in a sound reproducer wherein the film 10 is fed into a casing 11 through an opening 12. The film once it is inside the casing 11 is directed over a film roller 13 to a cylindrical sound aperture block 14 which is mounted upon the block 15 and also mounts and secures a socket 16 for a photoelectric cell 17. Socket 16 is cushioned within the block 15 so that the photoelectric cell 17 and its electrical connections are isolated from mechanical vibrations which may be transmitted from the frame 18 carrying the sound reproducer. The block 14 is provided with an aperture 19. A cup shaped shell 20 is telescoped within the block 14 and secured in place by a slot 21 therein and a pin 22. The shell 20 is also apertured as indicated at 23 to permit light entering through the aperture 19 to reach the photoelectric cell 17. The film is passed around a film sprocket 24 and over a roller 25 which is adapted to hold the film against the sprocket 24. From this point the film passes over a sprocket 26 and downwardly through an opening 27 in the bottom of the sound casing 11 to a suitable reel 28.

In order to assure adequate and even tension upon the film at all times, the film is engaged before it reaches the roller 13 by a roller 29 on the outer end of a weighted arm 30 which is pivoted at 31 in the sound casing 11. This arm carries a weight 32 which continually holds the roller 29 against the film and insures the film being fed to the scanning device under adequate and even tension at all times.

Figure 2:
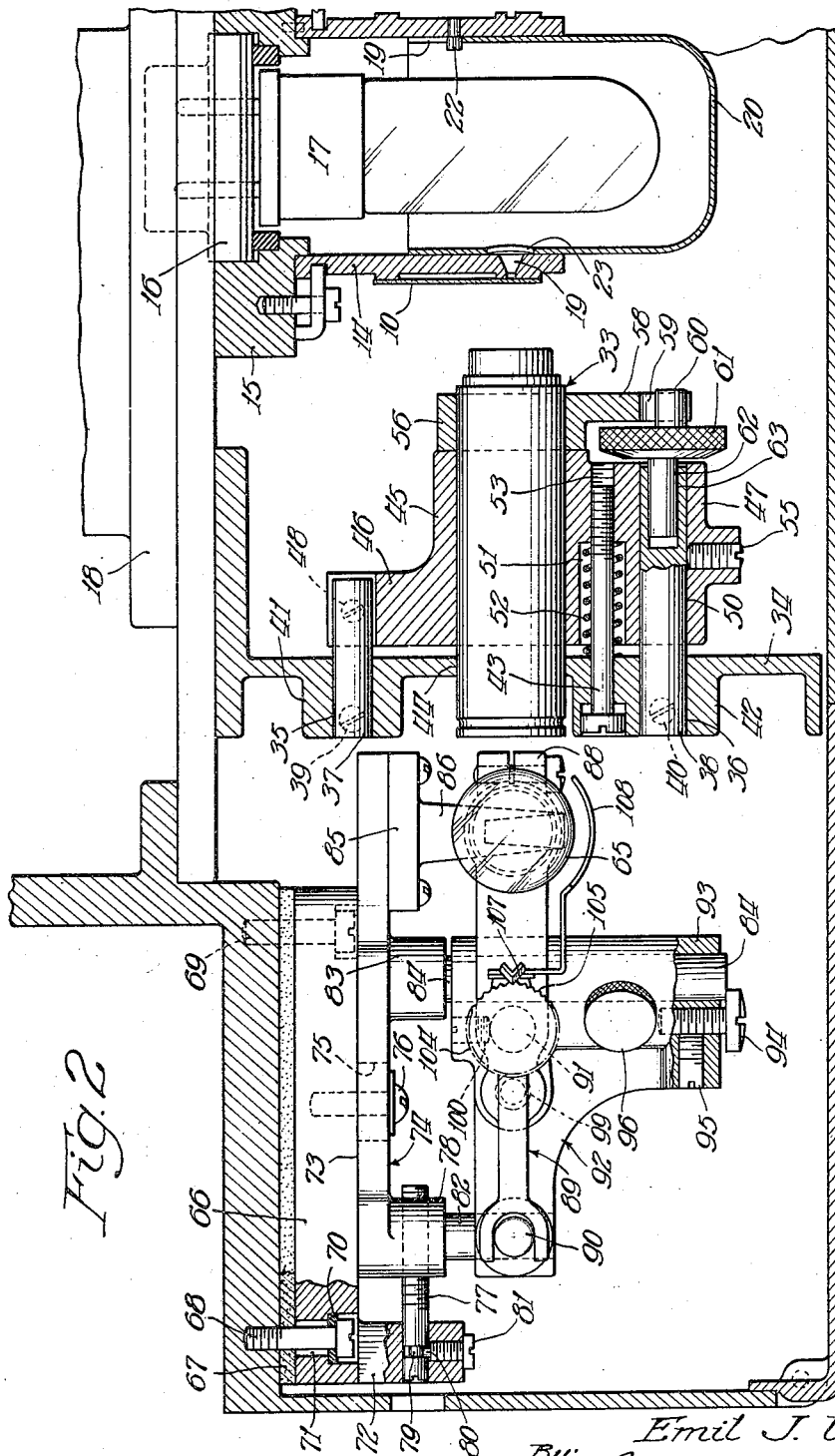
Fig. 2 is a sectional view taken on the line 2—2 of Fig. 1.

Now in order to supply light to the sound slit as the film passes over it, a novel means is provided for mounting a lens 33 so that the same may be accurately focused and adjusted parallel to the sound track recordings and sealed in this position. For this purpose, the casing 11 carries a partition wall 34. This partition wall has holes at 35 and 36 in which cylindrical studs 37 and 38 are fixed by means of set screws 39 and 40. The partition 34, it will be noted, is provided with bosses 41 and 42 in which the holes 35 and 36 are located so as to provide a long bearing surface and assure accurate alignment of the studs 37 and 38. The boss 42 is also drilled to receive an adjusting screw 43, the purpose of which will be more clearly explained hereinafter. The lens 33 passes through a hole 44 between the bosses 41 and 42 and is housed within a split sleeve 45. The split sleeve 45 has oppositely directed ribs 46 and 47 (see Fig. 4 and Fig. 2). The rib 46 is forked at its free end to receive the stud 37. A set screw 48 is used to set the rib 46 on the stud 37 to take care of any manufacturing error and prevent play of the rib 46 on the stud, and a second set screw 49 locks the first screw 48 in any adjusted position. The rib 47 is bored at 50 to receive the stud 38. It is also bored at 51 to provide an opening somewhat larger than the screw 43 in which a spring 52 surrounding the screw 43 is placed. This spring presses against the partition. The threaded end of the screw 43 is threaded into a screw threaded opening 53 which extends through the rib 47 from the bottom of the recesses 51 in line with this recess.

The split sleeve 45 is clamped upon the lens 33 by a screw 54 (see Fig. 1). It will be evident that the lens 33 when located in the split sleeve 45 can be moved toward and away from the sound slit at 19 by the operation of the screw 43 and the spring 52. The studs 37 and 38 will insure the movement of the split sleeve 45 in a proper direction with respect to the sound slit 19. When the lens has been set at the proper distance from the sound slit, it is locked in place by a set screw 55 locking the rib 47 to the stud 38.

In order to insure parallel alignment of the lens, focused as described above, with the sound track on the film, means is provided whereby the lens 33 may be rotated to a limited degree for final setting of the lens in this regard. A split ring 56 is clamped upon the lens 33 by a screw 57. The end of the sleeve 45 is finished accurately and the face of the split ring 56 is fitted flush against this finished surface. This ring has a laterally extending arm 58 which is provided at its outer end with a recess 59 adapted to receive an eccentrically located pin 60 upon a knurled disk 61. This knurled disk has a bearing pin 62 journalled in a recess 63 in the end of the stud 38. Thus, after the lens has been set at the proper distance from the sound slit, the clamping screw 54 is loosened so that, by operating the disk 61, a very fine adjustment of the lens 33 into parallelism with the sound track on the film may be accomplished. After the final setting is made, it is only necessary to again tighten the screw 54 and to finally lock the lens in its finally adjusted position.

To complete the necessary focusing of the light system upon the sound track of the film, it is also necessary to focus a lamp 65 with respect to the lens 33. It is further necessary to insure proper operation to isolate this lamp from the mechanical vibrations incident to the operation of the projector which carries the sound mechanism. The lamp mounting comprises a mounting block 66 which is spaced from the casing of the sound reproducer by a vibration absorbing layer 67 which may be a felt or similar suitable substance. The block 66 is secured in place by screws 68 and 69, suitable felt washers 70 being used beneath the heads of the screws 68 and 69 to prevent the screws from ccommunicating vibrations to the block 66. The screws are also spaced as indicated at 71 from the block 66 in order that the entire bearing surface between the screws and the block 66 shall be through the vibration dampening washers 70. The block 66 carries an upstanding lug 72 at one end, and between this lug and the other end it is provided with a flat surface 73 adapted to receive and guide a lamp mounting frame 74. This frame is slotted at 75, and a screw 76 clamps the frame 74 to the block 66.

Longitudinal adjustments within the limits of the slot 75 and longitudinal alignment of the frame 74 are accomplished by threading a screw 77 through a boss 78 on the frame 74 and journalling this screw in the lug 72 of the mounting block 66. To hold the screw 77 against endwise movement in the lug 72, the screw is provided with an annular groove 79 into which extends a reduced end 80 of a screw 81 threaded into the lug 72.

The boss 78 carries a stud 82 which extends in a horizontal direction from the frame 74. A second boss 83 carries a stud 84 extending parallel to the stud 82. Also adjacent to the partition wall 34 an insulating block 85 is secured on the frame 74. This block 85 is provided with a contact making spring 86. The lamp 65 is mounted in a lamp socket 87 which is screw threaded within a split yoke 88 that forms part of a lamp holder 89. The lamp holder 89 is mounted for vertical movement upon a pair of studs 90 and 91 (see Figs. 1, 2, and 5). The studs 90 and 91 are supported by a bracket 92 which is horizontally adjustable upon the studs 82 and 84. To adjust the bracket 92 horizontally upon the studs 82 and 84, this bracket is provided with an elongated sleeve portion 93 for the stud 84. A screw 94 is threaded into the sleeve 93, and its head overlaps the end of the stud 84. When the bracket 92 is mounted on the stud 84, it can be set by hand to the proper position so that the light beam from the lens straddles the light aperture. Since this adjustment is not critical, hand adjustment is sufficient. When the proper horizontal adjustment has been made, a set screw 96 having a knurled head is utilized to lock the sleeve portion 93 to the stud 84. Then the screw 94 is turned until its head strikes the end of the stud 84. The screw 94 is then locked in place by a set screw 95 so that, if the bracket 92 is subsequently removed, it can be quickly returned to proper position by pushing it inward on stud 84 until the head of the screw 94 again strikes the end of the stud 84. The lamp holder 89 has a recess 97 (see Fig. 3 and Fig. 1), and the bracket 92 has a recess 98 adapted to receive the opposite ends of a spring 99 which yieldingly urges the lamp holder 89 upwardly on the studs 90 and 91.

For adjusting the vertical position of the lamp holder 89 on the studs 90 and 91 which are secured in the bracket 92 by suitable set screws such as 100 and 101, the stud 91 has a screw threaded recess 102 in the top thereof into which an adjusting screw 103 is threaded. This adjusting screw has a head 104 provided with vertically running peripheral notches as shown best in Fig. 2 at 105. The head 104 rides on the top of the lamp holder 89. Thus, if the screw 103 is turned so as to extend into the recess 102, the holder 89 will be moved downwardly against the pressure of the spring 99, and conversely, if the screw 103 is turned in the opposite direction, the spring 99 will move the lamp holder 89 upwardly. A spring arm 106 is mounted on the lamp holder 89 and has a V-shaped head 107 adapted to seat in the notches 105 provided in the head 104. The lamp holder 89 also carries a lamp shield 108 which is secured together with the arm 106 to the lamp by suitable screws 109.

The adjustments provided herein for the lamp makes it easy to pre-set and focus a lamp unit. In order to be able to quickly replace a burned out lamp, an extra bracket 92 carrying a lamp is pre-set and kept on hand. It is only necessary then to release screw 96 of the bracket 92 to be removed and take it off and then to put on the extra bracket 92, which has been pre-set, and, when the head of its screw 94 strikes the end of the stud 84, it is properly positioned. It is then locked in place by its screw 96.

From the above description, it is believed that the construction and advantages of this device will be readily apparent to those skilled in this art.

Having thus described one specific form of my invention, what I claim as new and desire to secure by Letters Patent is:

1. In a device of the character described, an exciter lamp mounting comprising a mounting block, a frame slidably mounted thereon, means for moving said frame on said block, a bracket adjustably mounted on said frame for movement at right angles to the direction of movement of said frame, adjusting means for said bracket, a lamp holder, means mounting said lamp holder on said bracket for movement at right angles to the directions of movement of said bracket and said frame, spring means tending to move said lamp holder in one direction on its mounting means and an adjusting screw threaded into said last named mounting means and having a head bearing on said lamp holder for pressing it against said spring.

2. In a device of the character described, an exciter lamp mounting comprising a mounting block, a frame slidably mounted thereon, means for moving said frame on said block, a bracket adjustably mounted on said frame for movement at right angles to the direction of movement of said frame, adjusting means for said bracket, a lamp holder, means mounting said lamp holder on said bracket for movement at right angles to the directions of movement of said bracket and said frame, spring means tending to move said lamp holder in one direction on its mounting means and an adjusting screw threaded into said last named mounting means and having a head bearing on said lamp holder for pressing it against said spring, said screw head having a multiplicity of notches in its periphery, and a spring pressed member adapted to seat in said notches to hold the screw in adjusted position.

3. In a device of the character described, mounting and focusing means for an exciter lamp comprising a lamp holder, means supporting said lamp holder comprising a member having spaced parallel vertical studs, said lamp holder having bearings slidably receiving said studs, a spring under compression interposed between the lamp holder and said member, an adjusting screw threaded into the free end of one of said studs and having a portion bearing on the lamp holder to hold it from moving away from said member, and means to hold said screw against rotation.

4. In a device of the character described, mounting and focusing means for an exciter lamp comprising a lamp holder, means supporting said lamp holder comprising a member having spaced parallel vertical studs, said lamp holder having bearings slidably receiving said studs, a spring under compression interposed between the lamp holder and said member, an adjusting screw threaded into the free end of one of said studs and having a portion bearing on the lamp holder to hold it from moving away from said member, and means to hold said screw against rotation, said last named means comprising a peripherally notched head on said screw and a spring pawl engaging the notched head.

5. In a sound reproducer of the character described having a photo-electric cell and a slit through which light is directed onto said cell and means to pass film having a sound record thereon over said slit, an exciter lamp, a sound slit lens for focusing light from said lamp upon said sound slit, and means for focusing and adjusting said lens, comprising a split sleeve in which said lens is held, means for clamping said sleeve upon the lens, spaced guides for said sleeve on opposite sides thereof, a frame supporting said guides, said sleeve being adjustable on the guides toward and away from the sound slit, and means to fix the sleeve in adjusted position, said sleeve having a yoke engaging one of said guides, and means for positioning the guide in the yoke.

6. In a sound reproducer of the character described having a photo-electric cell and a slit through which light is directed onto said cell and means to pass film having a sound record thereon over said slit, an exciter lamp, a sound slit lens for focusing light from said lamp upon said sound slit, and means for focusing and adjusting said lens, comprising a split sleeve in which said lens is held, means for clamping said sleeve upon the lens, spaced guides for said sleeve on opposite sides thereof, a frame supporting said guides, said sleeve being adjustable on the guides toward and away from the sound slit, said split sleeve having means thereon for rotatably adjusting said lens in the split sleeve.

7. In a sound reproducer of the character described having a photo-electric cell and a slit through which light is directed onto said cell and means to pass film having a sound record thereon over said slit, an exciter lamp, a sound slit lens for focusing light from said lamp upon said sound slit, and means for focusing and adjusting said lens, comprising a split sleeve in which said lens is held, means for clamping said sleeve upon the lens, spaced guides for said sleeve on opposite sides thereof, a frame supporting said guides, said sleeve being adjustable on the guides toward and away from the sound slit, said split sleeve having means thereon for rotatably adjusting said lens in the split sleeve, said last named means comprising an arm fixed to the lens and a disk rotatably journalled in the split sleeve, and having an eccentric pin thereon engaging a slot in said arm.

EMIL J. WIENKE.